(12) United States Patent
Stojanovic et al.

(10) Patent No.: US 8,266,601 B2
(45) Date of Patent: Sep. 11, 2012

(54) FRAMEWORK FOR INTEROPERABILITY OF SOLVERS

(75) Inventors: Alexander Sasha Stojanovic, Redmond, WA (US); Min Wei, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 902 days.

(21) Appl. No.: 12/338,159

(22) Filed: Dec. 18, 2008

(65) Prior Publication Data
US 2010/0161289 A1 Jun. 24, 2010

(51) Int. Cl.
G06F 9/45 (2006.01)
(52) U.S. Cl. ............ 717/136; 717/107; 717/716; 703/6; 705/400; 375/355; 715/810
(58) Field of Classification Search .................. 703/2, 3, 703/6; 717/136, 116, 107; 715/810; 375/355
See application file for complete search history.

(56) References Cited

U.S. PATENT DOCUMENTS

| | | | |
|---|---|---|---|
| 5,787,283 A * | 7/1998 | Chin et al. ................... | 717/101 |
| 6,253,205 B1 * | 6/2001 | Quarato et al. ................. | 1/1 |
| 6,591,256 B1 * | 7/2003 | Friedman ..................... | 706/45 |
| 7,324,931 B1 * | 1/2008 | Warlock ....................... | 703/13 |
| 7,343,355 B2 * | 3/2008 | Ivanov et al. ................. | 705/400 |
| 7,533,148 B2 * | 5/2009 | McMillan et al. ............. | 709/206 |
| 7,546,578 B2 * | 6/2009 | Yang ............................ | 717/108 |
| 7,694,272 B2 * | 4/2010 | Bronicki et al. .............. | 717/109 |
| 7,725,199 B2 * | 5/2010 | Brackney ..................... | 700/29 |
| 7,933,755 B1 * | 4/2011 | Warlock ....................... | 703/6 |
| 7,979,243 B1 * | 7/2011 | Mosterman et al. ........... | 703/2 |
| 2002/0194039 A1 * | 12/2002 | Bhaskaran et al. ............ | 705/7 |
| 2003/0187773 A1 * | 10/2003 | Santos et al. .................. | 705/37 |
| 2006/0165040 A1 * | 7/2006 | Rathod et al. ................ | 370/335 |
| 2007/0288419 A1 * | 12/2007 | Strassner ....................... | 706/55 |
| 2008/0306726 A1 * | 12/2008 | Levy ............................ | 704/2 |
| 2009/0089021 A1 * | 4/2009 | Jiang et al. .................... | 703/2 |
| 2010/0198799 A1 * | 8/2010 | Krishnan et al. .............. | 707/702 |

OTHER PUBLICATIONS

Shiffer, Mark, "Microsoft Solver Foundation", retrieved at <<http://blog.mssoftwareconsulting.com/msswc/blog/post/Microsoft-Solver-Foundation.aspx>>, Sep. 2, 2008, pp. 4.
"Microsoft Solver Foundation—Customer Technology Preview", retrieved at <<http://code.msdn.microsoft.com/solverfoundation>>, Sep. 30, 2008, pp. 2.
Houstis, et al., "On the Future of Problem Solving Environments", retrieved at <<http://www.cs.purdue.edu/homes/jrr/pubs/kozo.pdf>>, Mar. 30, 2000, pp. 1-78.

(Continued)

*Primary Examiner* — Don Wong
*Assistant Examiner* — Mohammad Kabir
(74) *Attorney, Agent, or Firm* — Capitol City TechLaw; Richard C. Irving (57) ABSTRACT

A framework may be provided for facilitating adoption of mathematical and logical solvers. A model, representing a problem, may be defined. The model may be defined: via a series of statements in a type safe common-language-specification compliant modeling language; via an intermediate format; or via a series of calls to a standardized application program interface. The framework may translate the defined model to an intermediate format, which many solvers may understand. The framework may provide a number of solver-related services including, but not limited to, services for creating a model, analyzing a model, selecting a well-suited solver based on analysis of a model, decomposing a model into multiple sub-models and providing the multiple sub-models to multiple solvers as multiple parallel threads, data binding, simulation, and post optimality analysis.

20 Claims, 6 Drawing Sheets

OTHER PUBLICATIONS

Stillman, Aaron James, "Model Composition within the Mobius Modeling Framework", retrieved at <<http://www.perform.csl.uiuc.edu/Papers/USAN_papers/99STI01.pdf>>, 1999, pp. 73.

"Oracle Crystal Ball", retrieved at <<http://www.oracle.com/appserver/business-intelligence/crystalball/index.html>>, Dec. 14, 2008, p. 1.

"ILOG Concert Technology", retrieved at <<http://www.ilog.com/products/optimization/tech/concert.cfm>>, Dec. 11, 2008, pp. 2.

"Powerful LINDO API Solvers", retrieved at <<http://www.lindo.com/index.php?view=article&catid=3%3Alindo-api&i...>>, Apr. 3, 2008, pp. 3.

"Ziena Optimization, Inc. Optimization Software, Modeling, and Consulting", retrieved at <<http://ziena.com/Knitro.htm>>, Dec. 14, 2008, p. 1.

Hentenryck, et al., "Constraint Programming in OPL", Proceedings of the International Conference on Principles and Practice of Declarative Programming, 1999, pp. 20.

Fourer, Robert, "Extending a General-Purpose Algebraic Modeling Language to Combinatorial Optimization: A logic Programming Approach", 1998, pp. 46.

Gay, David M. "Hooking Your Solver to AMPL", Technical Report, Apr. 18, 1997, pp. 31.

Ziena Optimization Inc. Optimization Software, Modeling, and Consulting, retrieved at <<http://ziena.com/threealgs.htm>>, Dec. 14, 2008, p. 1.

"Xpress-MP Optimization Suite", retrieved at <<www.fairisaac.com>>, Dec. 14, 2008, pp. 2.

"Risk Solver—Powerful, Interactive Risk Analysis in Excel", retrieved at <<http://www.solver.com/risksolver.htm>>, Dec. 14, 2008, pp. 3.

"Lingo 11.0—Optimization Modeling Software for Linear, Nonlinear, and Integer Programming", retrieved at <<http://www.lindo.com/index.php?option=com_content&view=article&id...>>, Apr. 3, 2008, pp. 2.

"ILOG OPL Development Studio:Rapid Development and Deployment", retrieved at <<http://www.ilog.com/products/oplstudio/>>, Dec. 11, 2008, pp. 2.

ILOG CPLEX: High-Performance Software for mathematical Programming>>, retrieved at <<http://www.ilog.com/products/cplex/>>, Dec. 11, 2008, pp. 2.

"Excel Solver, Premium Solver, Risk Solver—Upgrades from Developers of the Microsoft Excel Solver", retrieved at <<http://www.solver.com/exceluse.htm>>, Dec. 14, 2008, pp. 3.

"Oracle Crystal Ball Decision Optimizer", retrieved at <<http://www.oracle.com/appserver/business-intelligence/crystalball/decision>>, Dec. 14, 2008, p. 1.

* cited by examiner

FRAMEWORK FOR INTEROPERABILITY OF SOLVERS

BACKGROUND

Solvers are executable code developed for providing solutions to problems represented as mathematical models. Some of the provided solutions may be optimized. Today, there are a number of different types of solvers for solving problems defined by different mathematical models. For example, a first type of solver is well-suited for solving problems defined by a linear model, a second type of solver is well-suited for solving problems defined by a quadratic model, a third type of solver is well-suited for solving problems defined by a mixed integer model, and a fifth type of solver is well-suited for solving constraint satisfaction problems defined by a model.

A solver may expect a model to be provided as input in a form of statements in a modeling language or a series of calls to a solver application program interface (API). Solvers are developed by a number of companies. A first solver developed by, for example, company "A" may expect a model to be provided as statements in a first modeling language, which may have been developed by company "A", or by a series of calls to a first type of API, which also may have been developed by company "A". A second solver developed by, for example, company "B" may expect a model to be provided as statements in a second modeling language, which may have been developed by company "B", or buy a series of calls to a second type of API, which also may have been developed by company "B". Thus, one may not be able to readily use multiple solvers developed by different companies.

Currently, many solvers will accept modeling language input in Mathematical Programming System (MPS) format. MPS is a file format for presenting linear programming and mixed integer programming problems. MPS is an old format, which is set up for punch cards, and may be somewhat cumbersome and time-consuming to use for defining models when compared to newer modeling languages.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

A framework may be provided for facilitating adoption of mathematical and logical solvers. A model, representing a problem, may be defined: via a modeling language, such as, for example, a type safe common-language-specification compliant modeling language; via a model in an intermediate format; or via a series of calls to a standardized application program interface.

A modeling language translator, embedded within the framework, may translate input in the type safe common-language-specification compliant modeling language to the intermediate format, which may be compatible with a number of solvers. A model defined via the standardized application program interface may be saved in the intermediate format.

When a solver is incapable of processing a model received in the intermediate format, a solver developer may develop an importer for transforming the model in the intermediate format to a format the solver understands. Alternatively, the solver developer may develop a parser and a compiler for converting a series of the standardized API calls to API calls for the solver.

The framework may provide a number of solver-related services for creating a model, analyzing a model, selecting a well-suited solver based on analysis of model, decomposing a model into multiple sub-models and providing the sub-models to multiple solvers as parallel threads, and data binding, as well as other services.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

Embodiments consistent with the subject matter of this disclosure include a framework for facilitating adoption of mathematical and logical solvers, as well as modeling languages. The framework may be based on a managed code framework including, but not limited to, the .NET framework, available from Microsoft Corporation of Redmond, Wash.

The framework may provide a facility for a problem to be defined via a modeling language, which may be a common-language-specification compliant modeling language. A common-language-specification (CLS) compliant modeling language is a modeling language that ensures interoperability by defining a set of features that developers can rely on to be available. In some embodiments, one CLS compliant modeling language that may be used to define problems is Optimization Modeling Language (OML), available from Microsoft Corporation. In other embodiments, other CLS compliant modeling languages may be used to define problems. CLS compliant modeling language statements may be converted to an intermediate format, which may be compatible with many solvers that may be used with the framework. In some embodiments, the intermediate format may be MPS, or another format.

A standardized application program interface (API) may be included within the framework for defining a model representing a problem. The defined model may be saved in the intermediate format, which may be provided to a solver.

The framework may provide a number of solver-related services, including, but not limited to, model instantiation, model analysis, selection of a well-suited solver based on the model analysis, decomposition of a complex model into multiple sub-models to be provided to a number of solvers, and data binding. In other embodiments, the framework may provide additional or different services.

Exemplary Processing Device

Figure 1:
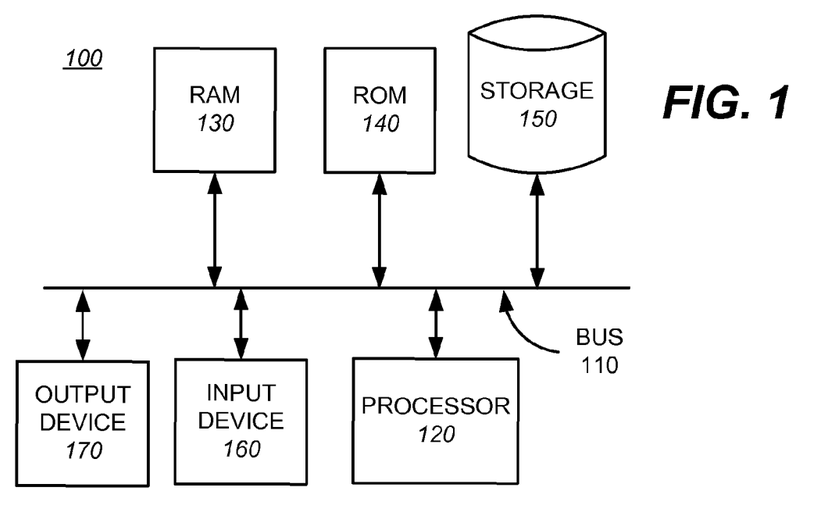
FIG. 1 is a functional block diagram of an exemplary processing device, which may be used to implement embodiments consistent with subject matter of this disclosure.

FIG. 1 is a functional block diagram of an exemplary processing device 100, which may be used to implement embodiments consistent with the subject matter of this disclosure. Processing device 100 may be a desktop personal computer (PC), a notebook or laptop PC, a server, or other processing device. Processing device 100 may include a bus 110, a processor 120, a random access memory (RAM) 130, a read only memory (ROM) 140, a storage device 150, an input device 160, and an output device 170. Bus 110 may permit communication among components of processing device 100.

Processor 120 may include at least one conventional processor or microprocessor that interprets and executes instructions. A memory may include RAM 130, ROM 140, or another type of dynamic or static storage device that stores information and instructions for execution by processor 120. RAM 130, or another type of dynamic storage device, may store instructions as well as temporary variables or other intermediate information used during execution of instructions by processor 120. ROM 140, or another type of static storage device, may store static information and instructions for processor 120. Storage device 150 may include a hard disk and corresponding drive, a flash-based storage device, or other type of data storage device or medium for storing data and/or instructions for processor 120.

Input device 160 may include a keyboard, a pointing device, an electronic pen, or other device for providing input. Output device 170 may include a display, a printer, or other device for outputting information.

Processing device 100 may perform functions in response to processor 120 executing sequences of instructions contained in a tangible machine-readable medium, such as, for example, RAM 130, ROM 140, storage device 150 or other medium. Such instructions may be read into RAM 130 from another machine-readable medium or from a separate device via a communication interface (not shown).

Logical Architecture

Figure 2:
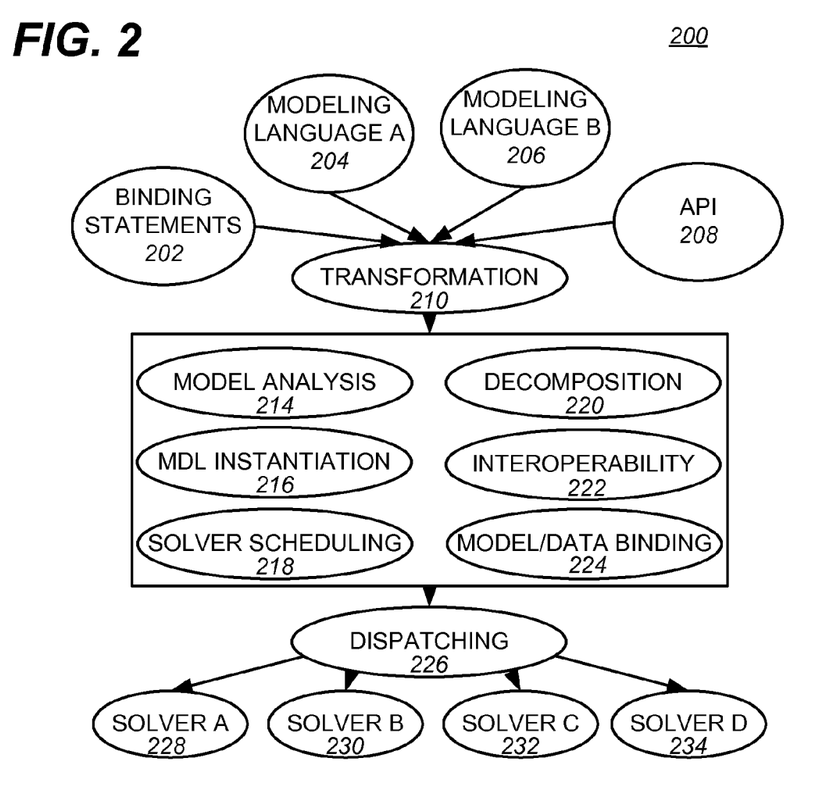
FIG. 2 is a diagram illustrating a logical structure of an embodiment consistent with the subject matter of this disclosure.

FIG. 2 illustrates a logical architecture of a framework 200 in an embodiment consistent with the subject matter of this disclosure. Input to framework 200 may be provided via a CLS compliant modeling language, such as, modeling language "A" 204 or modeling language "B" 206. In some embodiments, modeling language "A" 204 and/or modeling language "B" may be type safe modeling languages.

A type safe modeling language may have a type system for preventing type errors. Each data item may be of a specific type and each method may have input and/or output of specific types. A type system may discover errors at runtime when a data item has a value inconsistent with the type of the data item, or when a method inputs or outputs data inconsistent with the specific types. For example, a type error may occur when a variable, specified as being of an integer type, has a value of 3.5.

A model may have a number of components, such as, for example, one or more decisions, one or more parameters, one or more constraints, and one or more goals. A decision represents an output of a model. A parameter represents an input to a model. A constraint represents a relationship to be maintained between decisions and parameters. A goal is a quantity to be minimized or maximized in a solution while satisfying all constraints.

One or more binding statements 202 may be provided for automatically and declaratively binding a data source to a modeling input, or parameter, and/or for binding a modeling output, or a decision, to a data sink.

The following is an example of modeling language statements in which a parameter object is data bound to a data source:

1. SolverContext context=SolverContext.GetContext( );
2. Model model=context.CreateModel ( );
3. Decision vz=new Decision (Domain. Real. Nonnegative, "barrel_Venezuela");
4. Decision sa=new Decision (Domain. Real. Nonnegative, "barrel_saudiarabia");
5. model.AddDecisions(vz, sa);
   // A parameter represents an input to the model
6. Parameter maxvz=new Parameter(Domain.RealNonnegative, "maxproduction_Venezuela");
7. Parameter maxsa=new Parameter(Domain.RealNonnegative, "maxproduction_saudiarabia");
   / A parameter is bound to data
8. maxvz.SetBinding(from row in ProductionCapacity where row.Country=="Venezuela" select row, "MaxProduction");
9. maxsa.SetBinding(from row in ProductionCapacity where row.Country=="Saudi Arabia" select row, "MaxProduction");
   model.AddParameters(maxvz, maxsa);

A SolverContext may hold a current model and may also provide services for data binding. Statements 1 and 2 above, obtain a context called "context" and create a data model within "context" called "model". Statements 3-5 define domains for decisions "vz" and "sa" as real nonnegative numbers and adds the decisions "vz" and "sa" to the model. Statements 6-8 define parameters "maxvz" and "maxsa" as having domains of as real nonnegative numbers. Statements 8 and 9 automatically and declaratively bind parameters "maxvz" and "maxsa" to a data item, "ProductionCapacity", in respective rows corresponding to Venezuela and Saudi Arabia, within a database, and add the parameters "maxvz" and "maxsa" to the model.

In various embodiments, LINQ may be used to automatically and declaratively bind data to a data source. LINQ allows SQL statements to be integrated into a software development language allowing them to be used as though they are part of the software development language. Thus, when the parameters "maxvz" and "maxsa" are used, the parameters have values corresponding to the bound data items.

Similarly, modeling output (a decision) may be automatically and declaratively bound to a data sink via LINQ. The following is an example of statements for automatically and declaratively data binding the decisions from the previous example to a database.

```
// Binding a decision looks just like binding a parameter
1. vz.SetBinding(from row in ProductionCapacity where
   row.Country="Venezuela" select row, "Production");
2. sa.SetBinding(from row in ProductionCapacity where
   row.Country="Saudi Arabia" select row, "Production");
3. model.AddDecisions(vz, sa);
```

In the above example, a data item, "ProductionCapacity", from a row corresponding to Venezuela, in a database, is automatically and declaratively bound to decision "vz" and a row corresponding to Saudi Arabia, in a database, is automatically and declaratively bound to decision "sa".

In addition to using data binding to automatically and declaratively bind a single item of data, a data bound decision or parameter may actually represent a table of values, similar to a multidimensional array. Values used to index into the table of values may be either numbers or strings. Below is an example, using the problem discussed above regarding a number of barrels to buy from a producer, which illustrates data binding with respect to a table of values.

```
// A set of possible countries
1. Set countries=new Set(Domain.Any, "countries");
   // One decision now represents all the variables on how
      much to buy
2. Decision buy=new Decision(Domain.RealNonnegative,
   "barrels", countries);
3. buy.SetBinding(ProductionCapacity, "Production",
   "Country"); model.AddDecisions(buy);
   // Parameters here represent entire columns of input data
4. Parameter max=new Parameter(Domain.RealNonnegative, "max", countries);
5. Parameter price=new Parameter(Domain.RealNonnegative, "price", countries);
6. Parameter yield=new Parameter(Domain.RealNonnegative, "yield", countries);
7. max.SetBinding(ProductionCapacity, "MaxProduction", "Country");
8. price.SetBinding(ProductionCapacity, "Price", "Country");
9. yield.SetBinding(ProductionCapacity, "Yield", "Country");
   model.AddParameters(max, price, yield);
   //Constraints or goals are specified algebraically and
      hydrated with the actual data
10. model.AddConstraints("productionlimit",
11. Model.ForEach(countries, c=>0<=buy[c]<=max[c]));
12. Model.Sum(Model.ForEach(countries, c=>yield[c]
    *buy[c]))>=2000);
13. model.AddGoal("cost", GoalKind.Minimize,
14. Model.Sum(Model.ForEach(countries, c=>price[c]
    *buy[c])));
15. Solution solution=context.Solve(new SimplexDirective( ));
16. context.PropagateDecisions( );
17. Report report=solution.GetReport( );
18. Console.Write("{0}", report);
```

In statement 1, a set object is used to capture possible index values, "countries", for each decision or parameter. Statement 2 defines a decision "buy", which represents all variables regarding how many barrels to buy. Statement 3 automatically and declaratively binds the decisions, "buy", to a column, "Production" of a table, "ProductionCapacity", in rows corresponding to different values of "country". Thus, the decision may represent all variables with respect to how much to buy from each country.

In statements 4-6, parameters, "max", "price", and "yield" are defined as having domains of real nonnegative numbers. Statements 7-9 automatically and declaratively bind parameters, "max", "price", and "yield", to respective columns, "MaxProduction", "Price", and "Yield", of the table, "ProductionCapacity", in rows corresponding to different values of "country".

Statements 10-14 add a constraint called "productionlimit". According to the constraint, for each of the countries, a value "c"$\geq$0$\leq$decision "buy[c]$\leq$parameter "max[c]" (statement 11), and "c"$\geq$parameter yield[c]$\geq$2000 (statement 12). A goal called "cost" is defined to minimize, for each country, price[c]*buy[c] (statements 13 and 14).

Statement 15 indicates that the model is to be solved by a simplex solver. Statement 16 indicates that data is to be written back through output data bindings. Statement 17 obtains a solution and generates a report.

Returning to FIG. 2, modeling language "A" 204 or modeling language "B" 206, along with any data binding statements may be transformed by transformation 210 to an intermediate format defining a model. In some embodiments, the intermediate format may be MPS. In other embodiments, another intermediate format may be used.

API 208 may be a standardized API having methods for defining a model including parameters, decisions, constraints, and goals, as well as, for writing a report including solver results. A model built as a result of calling API 208 may be transformed by transformation 210 to the intermediate format.

Solver services 212 may perform model instantiation 216 with respect to a model defined by the intermediate format, may perform model analysis 214, model/data binding 224, solver scheduling 218, and launching or dispatching 226 the model to one of a number of solvers, such as, for example, solver "A" 228, solver "B" 230, solver "C" 232, and solver "D" 234. Further, solver services 212 may perform decomposition 220 of a model into a number of sub-models, that may be scheduled and launched, or dispatched 226, as multiple parallel threads to be solved by multiple solvers across multiple processors.

Figure 3:
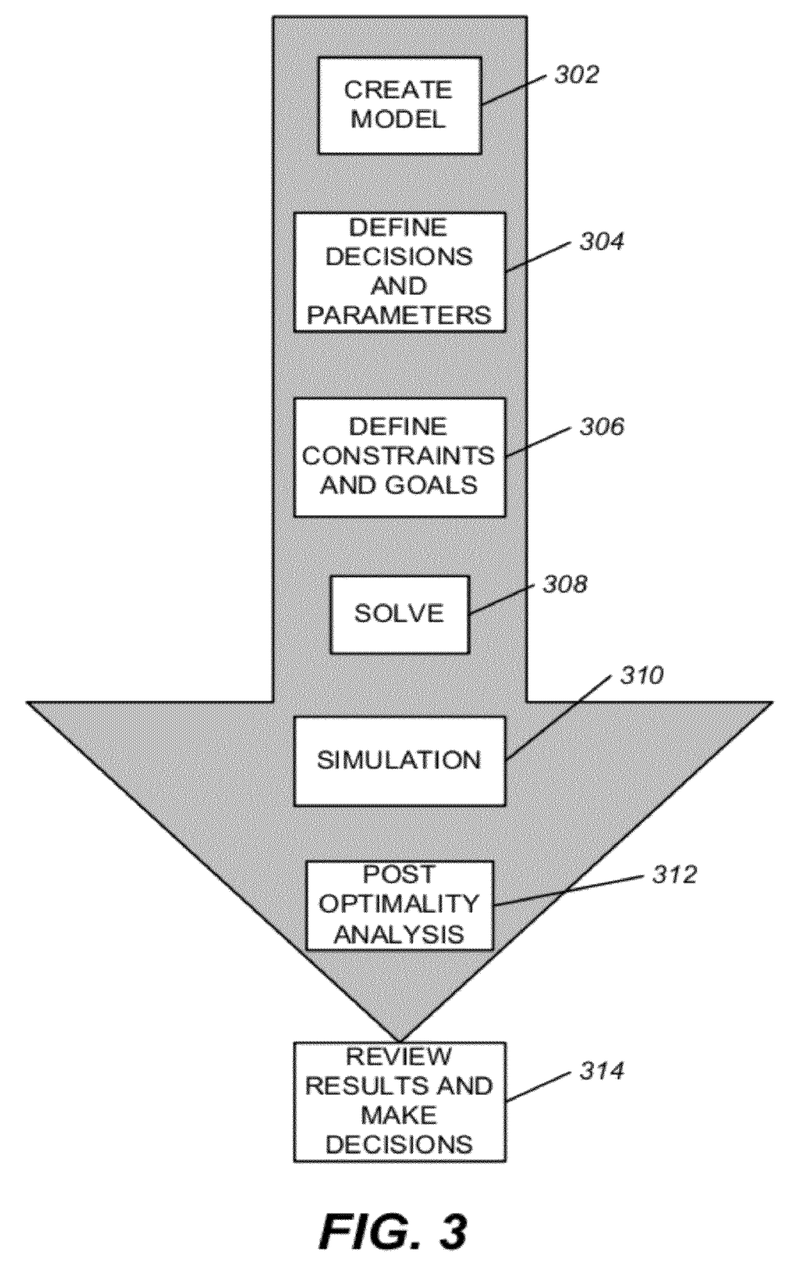
FIG. 3 illustrates an exemplary workflow in an embodiment consistent with the subject matter of this disclosure.

FIG. 3 illustrates an exemplary high-level workflow in an embodiment consistent with the subject matter of this disclosure. First, a model representing a problem may be created (302). Next, decisions and parameters may be defined (304) as well as constraints and goals (306). The model may then be dispatched to one or more solvers to solve (308). In some embodiments, a simulation of a solution may be performed using stochastically distributed generated parameters (310).

A post optimality analysis of results, or solutions, may be performed (312). The post-optimality analysis may determine a sensitivity of the model to a change in one or more parameters. For example, assume that a model represents a problem for determining an optimal number of barrels of oil to purchase from two suppliers to produce a certain amount of gasoline. The post optimality analysis may determine a sensitivity of the solution to change if a price of oil decreases or increases, if transportation costs decrease or increase, etc., and a sensitivity report may be produced providing information regarding sensitivity of the solution to change. In other embodiments, the post optimality analysis may direct solvers to try different strategies for solving a problem. Solutions from solvers may be collected and a report may be provided including additional information, such as, for example, an amount of memory used, CPU utilization, and amount of CPU time used to reach a solution, and/or other information. A user may then review results and make decisions (314).

Framework

Figure 4:
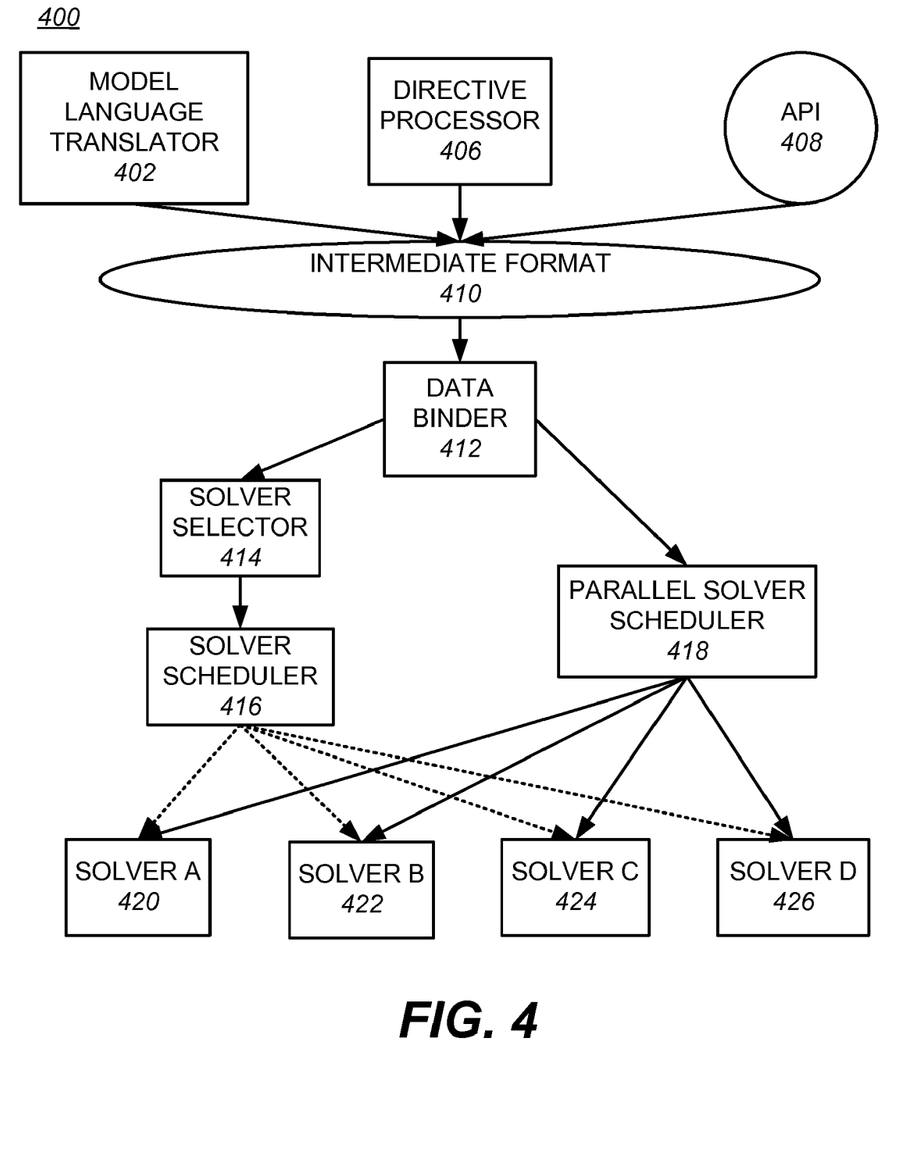
FIG. 4 is a functional block diagram of an embodiment of a framework consistent with the subject matter of this disclosure.

FIG. 4 illustrates a functional block diagram of an exemplary framework 400 in an embodiment consistent with the subject matter of this disclosure. Framework 400 may include model language translator 402, directive processor 406, a standardized API 408, an intermediate format 410, a data binder 412, a solver selector 414, a solver scheduler 416, a parallel solver scheduler 418, and multiple solvers of varying types 420, 422, 424, 426.

Model language translator 402 may receive input as a type safe CLS compliant modeling language. The modeling language may include OML or another type safe CLS compliant modeling language. The input may include data binding statements for automatically and declaratively binding modeling input (parameters) to a data source and/or modeling output (decisions) to a data sink. As previously mentioned, LINQ may be used to achieve data binding. Model language translator 402 may translate the input modeling language to an intermediate format 410. In some embodiments, the intermediate format may be MPS. In other embodiments, a different intermediate format may be employed.

In some embodiments, a model may be defined in intermediate format 410 by a user. If intermediate format 410 is to be input, then intermediate format 410 may not be translated by model translator 402.

Directive processor 406 may process one or more directives. The one or more directives may provide a hint, or hints, to a solver regarding how to configure the solver to solve a problem. The hint, or hints, may include a search technique, information regarding which solver to use, or other information useful for solving the problem.

API 408 may be an API having methods for defining a model including parameters, decisions, constraints, and goals, as well as for performing other functions. A model built as a result of calling API 408 may be saved in intermediate format 410.

Data binder 412 may ensure that model data is bound to a data source and/or a data sink, as specified by data binding statements included in intermediate format 410. As previously mentioned, LINQ may be used by data binder 412 to bind data to a data source or a data sink.

Solver selector 414 may receive intermediate format 410 for a model, may analyze the model, and may select a well-suited solver for solving a problem represented by the model.

Solver scheduler 416 may pass intermediate format 410 to a selected one of solvers 420, 422, 424, 426, may dispatch, or launch, the selected one of the solvers 420, 422, 424, 426, and may collect a result, or solution, from the selected one of the solvers 420, 422, 424, 426. The solution may be indicated as feasible, infeasible, optimal, or unknown. In FIG. 4, a dashed line-arrow from solver scheduler 416 to solvers 420, 422, 424, 426 indicates that solver scheduler 416 launches one of solvers 420, 422, 424, 426.

Parallel solver scheduler 418 may receive intermediate format 410 for a model and may analyze the model. A determination may be made regarding whether the model is to be decomposed into multiple sub-models to be solved by multiple types of solvers 420, 422, 424, 426. The model is to be decomposed if the model cannot otherwise be solved. If the model is to be decomposed into multiple sub-models, then the model is decomposed into multiple sub-models, the multiple sub-models may be passed as corresponding intermediate format 410 to respective solvers 420, 422, 424, 426, parallel solver scheduler 418 may launch respective solvers 420, 422, 424, 426 as parallel multiple threads across multiple processors, and may collect results, or solutions from respective solvers 420, 422, 424, 426.

Although FIG. 4 illustrates only four solvers, fewer or more solvers may be used with framework 400.

In cases in which a solver is incapable of processing a model received in an intermediate format or is incapable of providing a solution in the intermediate format, a developer of the solver may have several options for making the solver compatible with framework 400. One option may include the solver developer developing an importer for transforming the received model from the intermediate format to a format the solver understands, and developing an exporter for transforming a solution from the solver to the intermediate format. A second option may include the solver developer developing an importer for transforming a model defined in a type safe CLS compliant modeling language, understood by model language translator 402, such as OML, or another modeling language, to a modeling language understood by the solver, and developing an exporter for transforming a solution from the solver to the type safe CLS compliant modeling language. A third option may include the solver developer developing a parser and a compiler for converting a series of API 408 to API calls for the solver, and developing a parser and a compiler for converting a solution from the solver to a series of API 408 calls.

The options described above are only exemplary. Other options may be employed in other embodiments consistent with the subject matter of this disclosure.

Exemplary Processing

Figure 5:
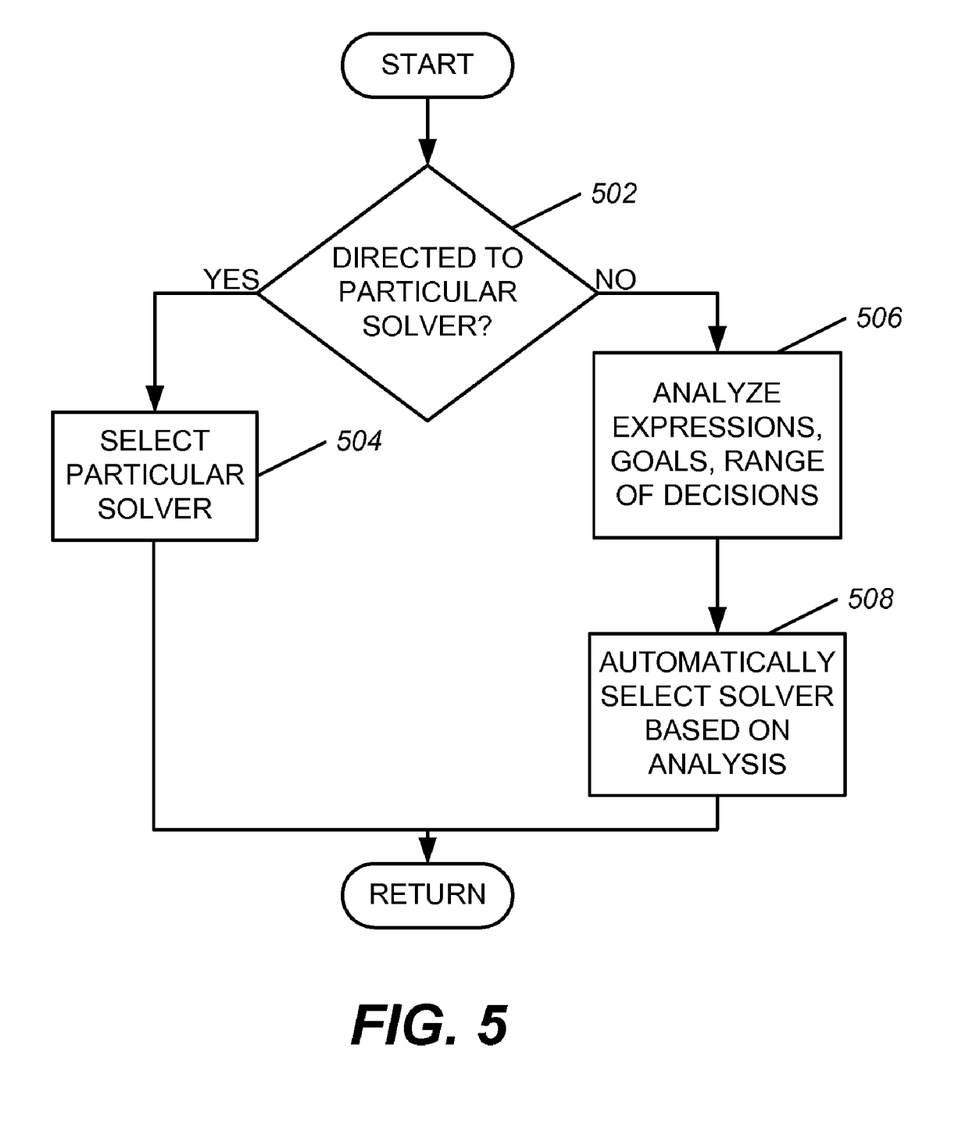
FIG. 5 is a flowchart of an exemplary process performed by a solver selector of FIG. 4.

FIG. 5 is a flowchart of an exemplary process that may be performed in an embodiment of solver selector 414 consistent with the subject matter of this disclosure. The process may begin with a check being performed to determine whether a directive was input directing that a problem represented by a model be solved by a particular solver (act 502). If a directive was input directing that a problem be solved by a particular solver, then solver selector 414 may select the particular solver (act 504) and the process may be completed.

If, during act 502, the check determines that no directive was input directing that a problem be solved by a particular solver, then solver selector 414 may analyze expressions, goals and a range of decisions of the model to determine a well-suited solver, from among a group of solvers, for solving the problem (act 506). The well-suited solver may then be automatically selected based on the analysis performed during act 506 (act 508). The process may then be completed.

Figure 6:
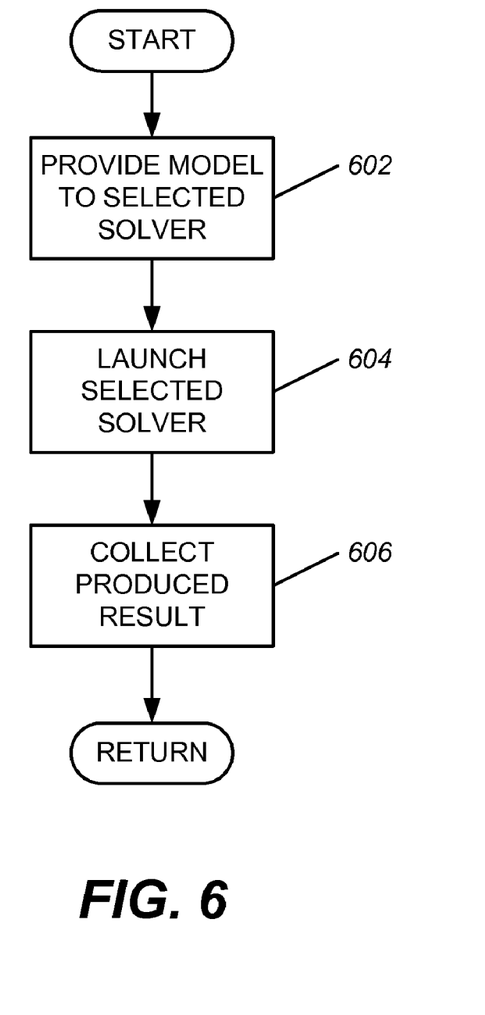
FIG. 6 is a flowchart of an exemplary process performed by a solver scheduler of FIG. 4.

FIG. 6 illustrates a flowchart of an exemplary process that may be performed by an embodiment of solver scheduler 416 consistent with the subject matter of this disclosure. The process may begin with solver scheduler 416 providing a model to a solver selected by solver selector 414 (act 602). Solver scheduler 416 may then launch the selected solver (act 604) and may collect any produced result, or solution, from the selected solver (act 606). The process may then be completed.

Solver scheduler 416 may perform post optimality analysis, as previously described, and may produce a report including additional information, such as, for example, an amount of memory used, CPU utilization, and amount of CPU time used to reach a solution, and/or other information.

Figure 7:
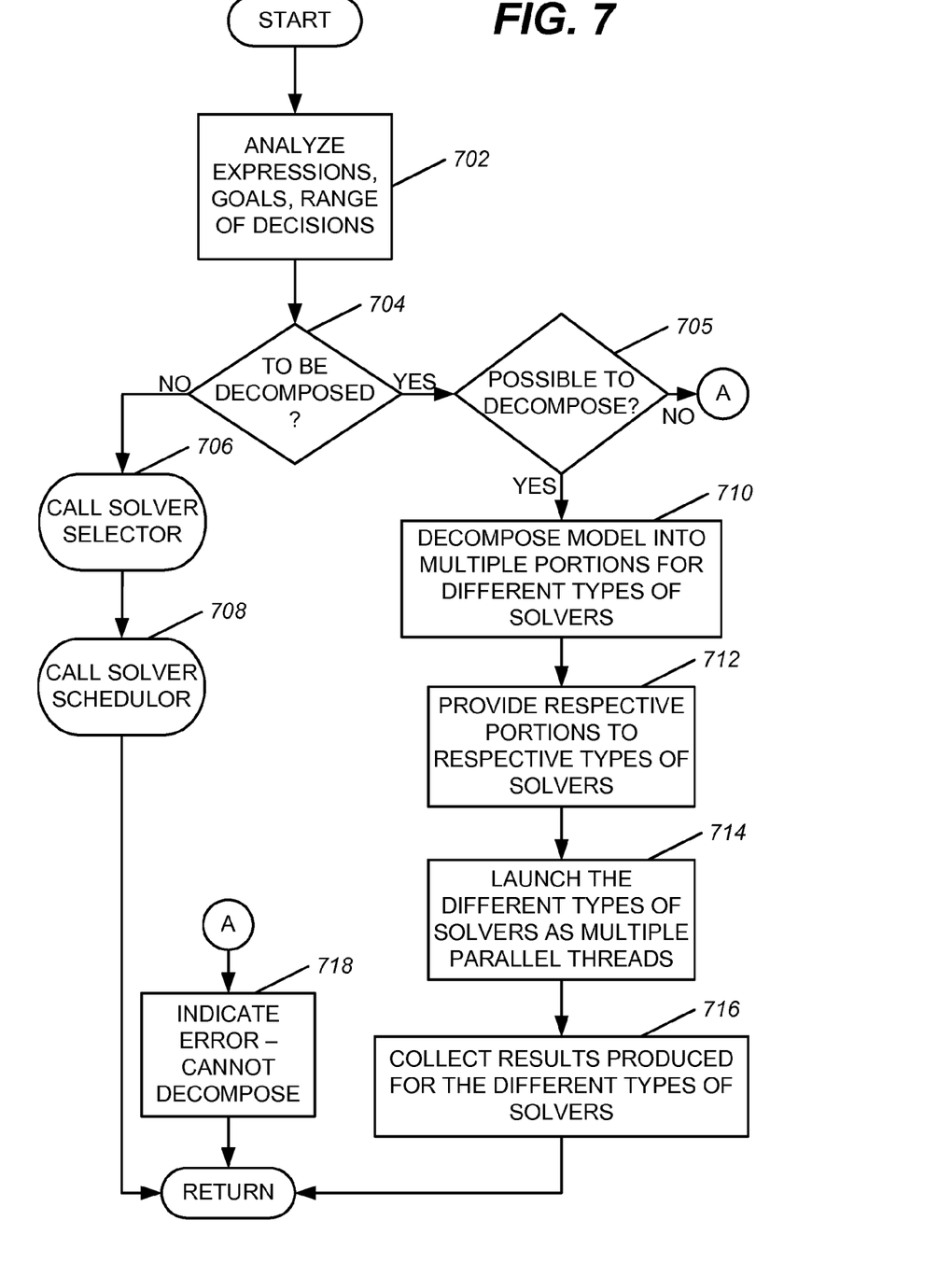
FIG. 7 is a flowchart of an exemplary process performed by a parallel solver scheduler of FIG. 4.

FIG. 7 is a flowchart illustrating exemplary processing in an embodiment of parallel solver scheduler 418 consistent with the subject matter of this disclosure. The process may begin with parallel solver scheduler 418 analyzing expressions, goals, a range of decisions, and/or other information of a model (act 702). Parallel solver scheduler 418 may then determine whether the model is to be decomposed into multiple portions, or sub-models, to be solved by solvers of different types, based on the analysis performed during act 702 (act 704). The model is to be decomposed if the model cannot otherwise be solved.

If, during act 704, parallel solver scheduler 418 determines that the model is not to be decomposed into multiple portions, or sub-models, then parallel solver scheduler 418 may call solver selector 414 to determine and select an appropriate solver, from among a group of solvers, for solving a problem represented by the model (act 706). Parallel solver scheduler 418 may then call solver scheduler 416 to schedule and launch the selected solver and collect a solution, or result, produced by the selected solver (act 708). The process may then be completed.

If, during act 704, parallel solver scheduler 418 determines that the model is to be decomposed into multiple portions, or sub-models, then parallel solver scheduler 418 may determine whether the model can be decomposed (act 705). If the model cannot be decomposed, then an error may be indicated and the model may be rejected (act 718) and the process may be completed.

If, during act 705, parallel solver scheduler 418 determines that the model can be decomposed, parallel solver scheduler 418 may decompose the model into multiple portions, or sub-models, for the solvers of different types (act 710). Respective portions, or sub-models may then be provided to respective ones of the solvers of different types (acts 712) and the solvers of different types may be launched as multiple parallel threads across multiple processors (acts 714). Parallel solver scheduler 418 may collect solutions, or results, produced by the solvers of the different types (acts 716). The process may then be completed.

Parallel solver scheduler 418 may collect solutions from the solvers, may perform post optimality analysis, as previously described, and may produce a report including additional information, such as, for example, an amount of memory used, CPU utilization, and amount of CPU time used to reach a solution, and/or other information.

Other Applications

Framework 400 may be used with other applications. For example, framework 400 may be used with a spreadsheet application, such as Excel (available from Microsoft Corporation of Redmond Wash.), or another spreadsheet application. The spreadsheet application may be enhanced with an add-in. The add-in may provide facilities for creating a model, checking validity of a model, specify binding of data from a database to cells of a spreadsheet, specify binding data from cells of the spreadsheet to a database, checking for and cleaning errors, and receiving detailed results and creating a summary. The spreadsheet application may produce the model as a type safe CLS compliant modeling language, as an intermediate language, or as a series of calls to a standardized API, such that framework 400 may provide the model to one or more solvers to solve. Framework 400 may produce a report, based on solutions from the one or more solvers, which may be provided to the spreadsheet application and presented to a user.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they are not be construed as limiting the claims in any way. Other configurations of the described embodiments are part of the scope of this disclosure. For example, in other embodiments, an order of acts performed by processes, such as the processes illustrated by FIGS. 5-7, may be different and/or may include additional or other acts. Additionally, in a different embodiment, the processes illustrated by FIGS. 5-7 may be performed by a number of processing devices, which communicate with one another via a network.

Accordingly, the appended claims and their legal equivalents define embodiments, rather than any specific examples given.

We claim as our invention:

1. A system to be executed within one or more processing devices to provide a framework for facilitating adoption of a plurality of solvers, the system comprising:
a modeling language translator embedded in the framework for receiving a model defined in a particular modeling language and outputting the model defined in a second modeling language;
a plurality of solvers for solving a problem as defined by a model;
an application program interface for interfacing with any of the plurality of solvers;
a data binder for binding either modeling input to a data source or modeling output to a data sink, or for binding both the modeling input to the data source and the modeling output to the data sink; and
a parallel solver scheduler for analyzing the model, decomposing the model into a plurality of sub-models of the model, providing respective ones of the sub-models to respective ones of the plurality of solvers that are well-suited for solving respective problems represented by the respective ones of the sub-models, launching the respective ones of the plurality of solvers as multiple parallel threads, and collecting respective produced solutions from the respective ones of the plurality of solvers, wherein
the particular modeling language is a common-language-specification compliant modeling language that ensures interoperability by defining a set of features that solver developers can rely on to be available.

2. The system of claim 1, wherein the particular modeling language is a type safe modeling language, capable of discovering errors at runtime when a data item has a value inconsistent with a type of the data item, or when a data item that is input or output is inconsistent with a type of the data item.

3. The system of claim 1, wherein the second modeling language includes an intermediate format.

4. The system of claim 1, wherein
the second modeling language includes Mathematical Programming System.

5. The system of claim 4, further comprising:
a solver selector for automatically analyzing a model and determining a well-suited type of one of the plurality of solvers to select to solve a problem defined by the analyzed model.

6. The system of claim 5, further comprising:
a solver scheduler for providing the model to the one of the plurality of selected solvers of the well-suited type, launching the one of the selected solvers, and collecting a produced solution.

7. A tangible machine-readable storage medium having instructions recorded thereon for at least one processor, the instructions comprising:
  instructions for providing a facility for specifying a model associated with a problem, the facility providing for the specifying of the model via a common-language-specification-compliant modeling language, an intermediate format, and a standardized application program interface, the common-language-specification-compliant modeling language ensuring interoperability by defining a set of features that solver developers can rely on to be available;
  instructions for providing a facility for translating the specified model in the common-language-specification-compliant modeling language to the intermediate format;
  instructions for providing the model to one of a plurality of solvers for solving the problem, the model being provided to the one of the plurality of solvers as input in the intermediate format; and
  instructions for collecting a solution produced by the one of the plurality of solvers and reporting a result.

8. The tangible machine-readable storage medium of claim 7, wherein the instructions further comprise:
  instructions for providing a facility for binding either modeling input to a data source or modeling output to a data sink, or for binding both the modeling input to the data source and the modeling output to the data sink.

9. The tangible machine-readable storage medium of claim 7, wherein the instructions further comprise:
  instructions for binding a parameter for a model to a data source; and
  instructions for binding a decision from a model to a data sink.

10. The tangible machine-readable storage medium of claim 7, wherein the instructions for providing the model to one of a plurality of solvers further comprise:
  instructions for providing the one of the plurality of solvers with configuration information according to one or more specified directives, the one or more specified directives providing at least one hint to the one of the plurality of solvers regarding how to configure the one of the plurality of solvers to solve a problem.

11. The tangible machine-readable storage medium of claim 7, wherein the instructions further comprise:
  instructions for simulating the solution to determine a sensitivity of the model with respect to specified constraints and decisions from the one of the plurality of solvers.

12. The tangible machine-readable storage medium of claim 7, wherein the instructions further comprise:
  instructions for performing a post-optimality analysis and producing a sensitivity report that provides information regarding sensitivity of the solution to change.

13. A processing device comprising:
  at least one processor; and
  a memory connected to the processor, the memory comprising:
  instructions for transforming statements in a common-language-specification compliant modeling language, for defining a model, to an intermediate format, the common-language-specification compliant modeling language ensures interoperability by defining a set of features that solver developers can rely on to be available,
  instructions for providing the intermediate format, defining a model, to a solver,
  instructions for providing a standardized application program interface for creating and defining a model,
  instructions for binding modeling input to a data source,
  instructions for binding modeling output to a data sink, and
  instructions for reporting a solution produced by a solver.

14. The processing device of claim 13, wherein the memory further comprises:
  instructions for analyzing a model and decomposing the model into a plurality of sub-models,
  instructions for providing respective ones of the sub-models to respective ones of a plurality of solvers well-suited for solving respective problems represented by the respective ones of the sub-models, and
  instructions for launching the respective ones of the plurality of solvers as multiple parallel threads over a plurality of processors.

15. The processing device of claim 14, wherein the memory further comprises:
  instructions for collecting results from the respective ones of the plurality of solvers, and
  instructions for presenting a report including information regarding the collected results.

16. The processing device of claim 13, wherein the memory further comprises:
  instructions for providing a model from a spreadsheet application, and
  wherein the instructions for binding modeling output to a data sink include instructions for binding the modeling output to one or more cells of a spreadsheet of the spreadsheet application.

17. The processing device of claim 13, wherein the memory further comprises:
  instructions for automatically configuring individual solvers based on one or more provided directives, the one or more provided directives providing at least one hint to the individual solvers regarding how to configure the individual solvers to solve a problem.

18. The processing device of claim 13, wherein the instructions for binding modeling output to a data sink further comprise:
  instructions for automatically and declaratively binding the modeling output to the data sink.

19. The system of claim 1, wherein
  the modeling input includes at least one parameter and the modeling output includes at least one decision.

20. The system of claim 1, further comprising:
  a directive processor for processing one or more directives, the one or more directives providing one or more hints, to one of the plurality of solvers regarding how to configure the one of the plurality of solvers to solve the problem.

* * * * *